No. 641,393. Patented Jan. 16, 1900.
W. O. JOHNSON.
MEAT HANGER.
(Application filed Aug. 18, 1899.)
(No Model.)
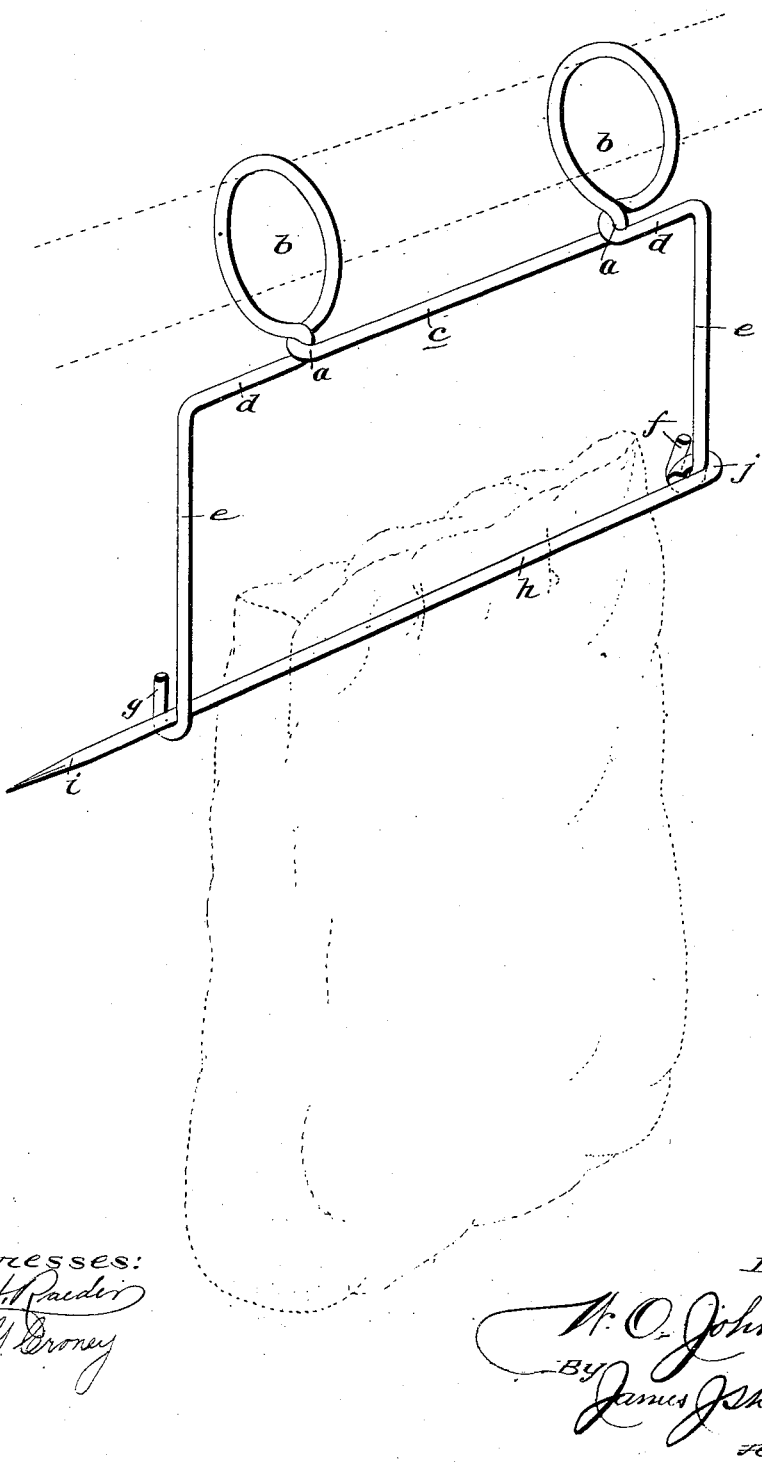

UNITED STATES PATENT OFFICE.

WILLIAM O. JOHNSON, OF SEATTLE, WASHINGTON.

MEAT-HANGER.

SPECIFICATION forming part of Letters Patent No. 641,393, dated January 16, 1900.

Application filed August 18, 1899. Serial No. 727,677. (No model.)

*To all whom it may concern:*

Be it known that I, WILLIAM O. JOHNSON, a citizen of the United States, residing at Seattle, in the county of King and State of Washington, have invented new and useful Improvements in Meat-Hangers, of which the following is a specification.

This invention relates to improvements in devices for suspending meat, such as bacon and the like; and it has for its object to construct such a device at a minimum expense and one which will hold the meat evenly on the bar of a meat-house or other support, it being capable of ready attachment to and removal from the meat.

I have illustrated the invention in the annexed drawing by a perspective view, a bar and also a piece of meat being represented by dotted lines.

In carrying out my invention I take a piece of wire of a sufficient length and gage, according to the size of the meat to be suspended, and twist the same at the points $a$, so as to form the two parallel eyes or loops $b$, said eyes being disposed vertically and in a plane transverse to the body portion $c$ of the wire. After forming these eyes I carry the wire outwardly in a horizontal plane and in opposite directions, as shown at $d$, after which I carry the ends downwardly, as shown at $e$, and terminate the same in hooks $f$ and $g$. The hook $f$ may be closed, while the hook $g$ should be left open for a purpose which will presently appear. After thus forming the body of the device I take a rod $h$, pointed at one end, as shown at $i$, and form a hook $j$ at its opposite end to engage the hook $f$ and connect the parts in a hinged manner. The hook $g$ should be disposed vertically, so that the pointed rod $h$, which is preferably composed of steel, may rest therein, and the weight of the meat will tend to keep the rod in its seat.

With a device as thus constructed it will be seen that the meat will be suspended evenly from the bar of a meat-house or other support, and the meat may be quickly fastened and removed from the holder when desired. It has been proposed to construct a hanger from wire, in which a single eye or loop is formed; but this has been found objectionable for many reasons, particularly in not holding the meat evenly. By the employment of the two eyes in my device this and all other objections are removed. When it is desirable to take the meat from the hanger, it is simply necessary to lift the pointed rod $h$ out of the hook $g$, when the said rod may be let down in a hinged manner and the meat taken off. To attach the device to the meat, it is simply necessary to run the pointed rod through the meat at the desired point and place the free end over the hook $g$.

Having thus described my invention, what I claim is—

The improved meat-hanger described composed of the wire having the two eyes formed therein and disposed transverse to the body thereof, and also having the depending branches terminating at their lower ends in hooks, and the pointed rod hinged at one end to one of the hooks and adapted to detachably engage the other hook, substantially as specified.

In testimony whereof I have hereunto set my hand in presence of two subscribing witnesses.

WILLIAM O. JOHNSON.

Witnesses:
CHARLES H. FRYE,
HARRY LEVERING.